US010839076B2

(12) United States Patent
Shenfeld et al.

(10) Patent No.: US 10,839,076 B2
(45) Date of Patent: *Nov. 17, 2020

(54) DETECTION OF CYBER MACHINERY ATTACKS

(71) Applicant: 3D Signals Ltd., Kfar Saba (IL)

(72) Inventors: Amnon Shenfeld, Herzliya (IL); Yair Lavi, Kfar-Saba (IL); Amit Ashkenazi, Hod Hasharon (IL); Ofer Affias, Hod Hasharon (IL)

(73) Assignee: 3D SIGNALS LTD., Kfar Saba (IL)

( * ) Notice: Subject to any disclaimer, the term of this patent is extended or adjusted under 35 U.S.C. 154(b) by 188 days.

This patent is subject to a terminal disclaimer.

(21) Appl. No.: 15/385,978

(22) Filed: Dec. 21, 2016

(65) Prior Publication Data

US 2018/0173879 A1 Jun. 21, 2018

(51) Int. Cl.
*G06F 21/00* (2013.01)
*G06F 21/56* (2013.01)
*H04L 29/06* (2006.01)
*H02P 29/032* (2016.01)

(52) U.S. Cl.
CPC .......... *G06F 21/566* (2013.01); *H02P 29/032* (2016.02); *H04L 63/1441* (2013.01)

(58) Field of Classification Search
CPC ...... G06F 21/566; H02P 29/028; H04L 63/02; H04L 63/1441
USPC ......................................................... 726/23
See application file for complete search history.

(56) References Cited

U.S. PATENT DOCUMENTS

| 3,758,758 A | 9/1973 | Games et al. |
| 5,822,212 A * | 10/1998 | Tanaka ............... G05B 19/4063 |
| | | 700/174 |
| 6,173,074 B1 | 1/2001 | Russo |
| 6,484,109 B1 | 11/2002 | Lofall |
| 6,507,790 B1 | 1/2003 | Radomski |
| 6,694,285 B1 | 2/2004 | Choe et al. |
| 6,763,312 B1 | 7/2004 | Judd |
| 6,778,894 B2 | 8/2004 | Beck et al. |
| 6,843,044 B2 | 1/2005 | Clauss |
| 7,752,665 B1 | 7/2010 | Robertson |

(Continued)

FOREIGN PATENT DOCUMENTS

| CN | 101709997 A | 5/2010 |
| CN | 105403730 A | 3/2016 |

(Continued)

OTHER PUBLICATIONS

Lavi et al., U.S. Appl. No. 15/382,765, filed Dec. 19, 2016.

(Continued)

*Primary Examiner* — Andrew J Steinle
*Assistant Examiner* — Sakinah White Taylor
(74) *Attorney, Agent, or Firm* — Kligler & Associates Patent Attorneys Ltd

(57) ABSTRACT

A method of cyber protection of a machine based on acquiring acoustic signals from a vicinity of the machine, while the machine is operative. The method includes analyzing the acquired acoustic signals to determine whether the machine or a controller of the machine is operating suspiciously and initiating a cyber measure on the controller of the machine, responsive to a determination based on the acquired acoustic signals that the machine or the controller is operating suspiciously.

9 Claims, 2 Drawing Sheets

(56) References Cited

U.S. PATENT DOCUMENTS

| | | | |
|---|---|---|---|
| 7,881,881 | B2 | 2/2011 | Giurgiutiu et al. |
| 7,940,189 | B2 | 5/2011 | Brown et al. |
| 8,554,494 | B2 | 10/2013 | Adnan et al. |
| 8,595,831 | B2 | 11/2013 | Skare |
| 8,600,627 | B2 | 12/2013 | Beck |
| 8,607,093 | B2 | 12/2013 | Dehaan et al. |
| 8,903,558 | B2 | 12/2014 | Jarrell et al. |
| 8,919,231 | B2 | 12/2014 | Butler et al. |
| 8,964,995 | B2 | 2/2015 | Cohn et al. |
| 8,983,677 | B2 | 3/2015 | Wright et al. |
| 9,342,695 | B2 | 5/2016 | Barkan |
| 9,378,455 | B2 | 6/2016 | Yufik |
| 9,401,932 | B2 | 7/2016 | Deerman et al. |
| 9,945,755 | B2 | 4/2018 | Pluemer |
| 9,971,667 | B1 | 5/2018 | Jenkins et al. |
| 9,989,439 | B2 | 6/2018 | Thomson |
| 2002/0020561 | A1* | 2/2002 | Alft ............... E21B 44/00 175/48 |
| 2002/0091491 | A1 | 7/2002 | Jackson et al. |
| 2002/0107625 | A1* | 8/2002 | Beck ............... A01D 41/127 701/50 |
| 2002/0194915 | A1 | 12/2002 | Abdel-Malek et al. |
| 2004/0117050 | A1 | 6/2004 | Oskin et al. |
| 2008/0271143 | A1 | 10/2008 | Stephens et al. |
| 2008/0276111 | A1 | 11/2008 | Jacoby et al. |
| 2008/0282781 | A1 | 11/2008 | Hemblade |
| 2010/0126258 | A1 | 5/2010 | Beck et al. |
| 2011/0301882 | A1 | 12/2011 | Andersen |
| 2011/0320139 | A1 | 12/2011 | Amir et al. |
| 2012/0136627 | A1 | 5/2012 | Jensen |
| 2013/0211558 | A1 | 8/2013 | Mishina et al. |
| 2014/0142737 | A1 | 5/2014 | Tanna et al. |
| 2014/0195184 | A1* | 7/2014 | Maeda ............... G01D 18/006 702/85 |
| 2014/0244192 | A1 | 8/2014 | Craig et al. |
| 2014/0298399 | A1 | 10/2014 | Heo et al. |
| 2015/0019169 | A1* | 1/2015 | Cheng ............... G06F 21/55 702/183 |
| 2015/0317475 | A1 | 11/2015 | Aguayo Gonzalez et al. |
| 2015/0346706 | A1 | 12/2015 | Gendelman et al. |
| 2016/0004225 | A1 | 1/2016 | Ellwein |
| 2016/0078365 | A1* | 3/2016 | Baumard ............... H04L 41/147 706/12 |
| 2016/0117503 | A1 | 4/2016 | Reed et al. |
| 2016/0117905 | A1 | 4/2016 | Powley et al. |
| 2016/0234235 | A1 | 8/2016 | Jover et al. |
| 2016/0275289 | A1 | 9/2016 | Sethumadhavan et al. |
| 2016/0277423 | A1 | 9/2016 | Apostolescu et al. |
| 2016/0342392 | A1 | 11/2016 | Tasaki |
| 2016/0377509 | A1 | 12/2016 | Cloake |

FOREIGN PATENT DOCUMENTS

| | | |
|---|---|---|
| DE | 3907419 A1 | 9/1990 |
| EP | 0317322 A2 | 5/1989 |
| EP | 3015866 A1 | 5/2016 |
| KR | 101587827 B1 | 1/2016 |
| WO | 0171362 A1 | 9/2001 |
| WO | 03048714 A1 | 6/2003 |
| WO | 2004059399 A1 | 7/2004 |
| WO | 2008142386 A1 | 11/2008 |
| WO | 2015102730 A2 | 7/2015 |
| WO | 2016115280 A1 | 7/2016 |

OTHER PUBLICATIONS

International Application # PCT/IB2016/057776 Search Report dated Apr. 20, 2017.

U.S. Appl. No. 15/382,765 office action dated Jan. 4, 2019.

Leclere et al., "A multi-order probabilistic approach for Instantaneous Angular Speed tracking debriefing of the CMMNO14 diagnosis contest", Mechanical Systems and Signal Processing 81, pp. 1-23, Mar. 24, 2016.

Microsoft Computer Dictionary, fifth edition, Microsoft Press, p. 133, year 2002.

Heng et al., "Statistical analysis of sound and vibration signals for monitoring rolling element bearing condition", Applied Acoustics, vol. 53, Issues 1-3, pp. 211-226, Jan.-Mar. 1998.

U.S. Appl. No. 16/240,748 office action dated Apr. 2, 2020.

European Application # 19205761.0 search report dated May 25, 2020.

European Application # 16896671.1 search report dated Oct. 7, 2019.

U.S. Appl. No. 16/240,748 Office Action dated Aug 5, 2020.

* cited by examiner

DETECTION OF CYBER MACHINERY ATTACKS

TECHNICAL FIELD

Embodiments described herein relate generally to machinery monitoring, and particularly to monitoring of machinery to identify cyber attacks.

BACKGROUND

Many machines and industrial facilities are controlled by software-controlled computer processors which serve as controllers. Such controllers are vulnerable to cyber attacks by malicious software.

Particularly, when the controller is connected to a network to allow for remote control and/or data gathering, the connection opens the controller to remote cyber attacks which can cause the controller to cause the machines and/or industrial facilities to operate differently than intended by their owners.

US patent publication 2014/0298399 to Heo et al., describes an apparatus for detecting an abnormality sign in a control system. The apparatus collects system state information, network information and security event information or transaction information and accordingly detects abnormalities indicative of cyber attacks.

US patent publication 2015/0346706 to Gendelman describes a method for automatic monitoring of control systems. The method includes receiving electronic measurement values measured on conductors of computerized control devices, automatically calculating normal data patterns based on the electronic measurement values and automatically detecting abnormal data patterns.

US patent publication 2016/0117503 to Reed describes using power fingerprinting to detect deviations from proper operation.

SUMMARY

Some embodiments of the present invention relate to monitoring machines based on acoustic signals, in order to identify possible cyber attacks on a controller of the machine.

There is therefore provided in accordance with an embodiment of the present invention a method of cyber protection of a machine, comprising acquiring acoustic signals from a vicinity of a machine, while the machine is operative, analyzing the acquired acoustic signals, by a processor, to determine whether the machine or a controller of the machine is operating suspiciously, and initiating, by the processor, a cyber measure on the controller of the machine, responsive to a determination based on the acquired acoustic signals that the machine or the controller is operating suspiciously.

Optionally, acquiring the acoustic signals comprises acquiring by an acoustic monitor including an acoustic sensor and the processor, wherein the acoustic monitor is not connected to the controller in a manner allowing data or instructions to be passed from the controller to the acoustic monitor.

Optionally, analyzing the acquired acoustic signals comprises calculating one or more operation parameter values of the machine from the acquired acoustic signals and determining whether the calculated one or more operation parameter values differs from an expected value range. Optionally, determining whether the calculated one or more operation parameter values differs from an expected value range comprises comparing the calculated one or more operation parameter values to one or more corresponding values reported by the controller.

Optionally, determining whether the calculated one or more operation parameter values differs from an expected value range comprises comparing the calculated one or more operation parameter values to one or more corresponding preconfigured thresholds.

Optionally, calculating one or more operation parameter values of the machine comprises calculating a repetition frequency of the machine and/or a velocity of fluid in the machine.

Optionally, initiating the cyber measure comprises initiating a malware scan of the controller and/or disconnecting the controller from the machine.

There is further provided in accordance with an embodiment of the present invention, apparatus for cyber protection of a machine, comprising a microphone for acquiring acoustic signals from a vicinity of a machine, while the machine is operative, a processor configured to analyze acoustic signals acquired by the microphone, to determine whether the machine is operating suspiciously; and an interface connecting the processor to a controller of the machine. The processor is configured to initiate a cyber measure on the controller, through the interface, responsive to a determination based on the acquired acoustic signals that the machine is operating suspiciously.

Optionally, the interface does not allow passage of instructions from the controller of the machine to the processor. Optionally, the processor is configured to calculate one or more operation parameter values of the machine from the acquired acoustic signals and determine whether the calculated one or more operation parameter values differs from an expected value range.

There is further provided in accordance with an embodiment of the present invention a method of cyber protection of a machine, comprising acquiring acoustic signals from a vicinity of a machine, while the machine is operative, analyzing the acquired acoustic signals, by a processor, to calculate values of one or more operation parameters of the machine from the acquired acoustic signals, receiving, by the processor, current values of the one or more operation parameters reported by a controller of the machine, comparing the values of the one or more operation parameters calculated by the processor to the corresponding received values, and generating an alert responsively to detecting a substantial discrepancy in the comparison.

Optionally, the one or more operation parameters comprise a machine repetition frequency and/or a fluid velocity.

There is further provided in accordance with an embodiment of the present invention a method of cyber protection of a machine, comprising acquiring acoustic signals from a vicinity of a machine, while the machine is operative, receiving information on a cyber behavior of a controller of the machine, calculating a suspicion score indicative of a probability that the machine is operating under instructions of malware on the controller, as a function of both the acquired acoustic signals and the received information on the cyber behavior.

Optionally, receiving information on the cyber behavior of the controller comprises receiving a cyber suspicion score calculated separately. Optionally, receiving information on the cyber behavior of the controller comprises receiving communication logs of the controller. Optionally, receiving information on the cyber behavior of the controller comprises receiving information on resource utilization of the controller. Optionally, calculating the suspicion score comprises applying a machine learning algorithm to the acquired acoustic signals.

There is further provided in accordance with an embodiment of the present invention a method of cyber protection of a machine, comprising acquiring acoustic signals from a vicinity of a machine, at a plurality of time points, determining, by a processor, changes in the acoustic signals over time responsively to the acquired acoustic signals at the plurality of time points, checking whether the determined changes have one or more characteristics indicative of intentional changes, and initiating, by the processor, a cyber alert, responsive to identifying in the checking, a characteristic indicative of intentional changes.

Optionally, checking whether the determined changes have one or more characteristics indicative of intentional changes comprises identifying abrupt changes followed by smooth operation.

Optionally, checking whether the determined changes have one or more characteristics indicative of intentional changes comprises identifying a first acoustic profile of the machine at a first time point, a second acoustic profile of the machine at a second time point, after the first time point, and a return to the first acoustic profile at a third time point after the second time point.

Optionally, checking whether the determined changes have one or more characteristics indicative of intentional changes comprises identifying a plurality of changes occurring at time points having a regularity indicative of being non-random.

Optionally, identifying the plurality of changes occurring at time points having a regularity indicative of being non-random comprises identifying a plurality of changes occurring at time points distanced from each other by equal intervals.

Alternatively or additionally, identifying the plurality of changes occurring at time points having a regularity indicative of being non-random comprises identifying a plurality of changes occurring at time points distanced from each other by round time intervals.

Optionally, identifying the plurality of changes occurring at time points having a regularity indicative of being non-random comprises identifying a plurality of changes occurring at time points at round clock times.

These and other embodiments will be more fully understood from the following detailed description of the embodiments thereof, taken together with the drawings in which:

DETAILED DESCRIPTION OF EMBODIMENTS

Overview

An aspect of some embodiments of the present invention relates to apparatus for acoustically monitoring a machine for cyber attacks, based on noise collected in the vicinity of the machine. When an analysis of the noise indicates a probability of a cyber attack, the apparatus initiates cyber scanning and/or cyber correction measures on a controller of the machine. The use of acoustic monitoring allows for independent analysis of the machine without physical or data connection to the machine and without dependence on the machine controller. Thus, the acoustic monitoring can identify sophisticated cyber attacks which alter the controller status reports in a manner which makes it hard to identify the cyber attack.

The cyber action initiated is optionally a cyber scan of the controller. Alternatively or additionally, the cyber action includes a scan of communications of the controller, for example a scan of a log of the controller communications. Further alternatively or additionally, the cyber action includes disconnection of the controller, replacement of the controller and/or a reformatting of the controller or one or more of its components.

An aspect of some embodiments of the present invention relates to comparing one or more operation parameter values of a machine received from a controller of the machine to corresponding parameter values determined from analysis of acoustic signals from the machine. If a mismatch between the parameter values from the different sources is identified, a warning is issued and/or protective measures are initiated.

An aspect of some embodiments of the present invention relates to apparatus for monitoring a machine for cyber attacks, which analyzes both acoustic signals from the machine and software operation of a controller of the machine. Upon identifying correlated suspicious signs in both the acoustic and software analysis, a cyber attack warning is initiated. Optionally, the monitor generates a suspicion score for each modality and a combined score reflecting the suspicion based on a plurality of modalities. Thus, cyber attacks not identifiable by a single modality may be identified.

An aspect of some embodiments of the present invention relates to apparatus for acoustically monitoring acoustic noise in the vicinity of the machine and generating an alert when an abnormal transition in the acoustic noise is identified.

In some embodiments of the invention, an alert is generated when a change pattern of noise over time includes repetitive segments, which are indicative in high probability of purposeful changes.

In other embodiments of the invention, an alert is generated when a change pattern of noise over time includes abrupt transitions followed by continued operation. Such abrupt transitions are assumed to be intended changes, as if they were due to a natural malfunctioning of the machine the malfunctioning would be expected to persist.

System Description

Figure 1:
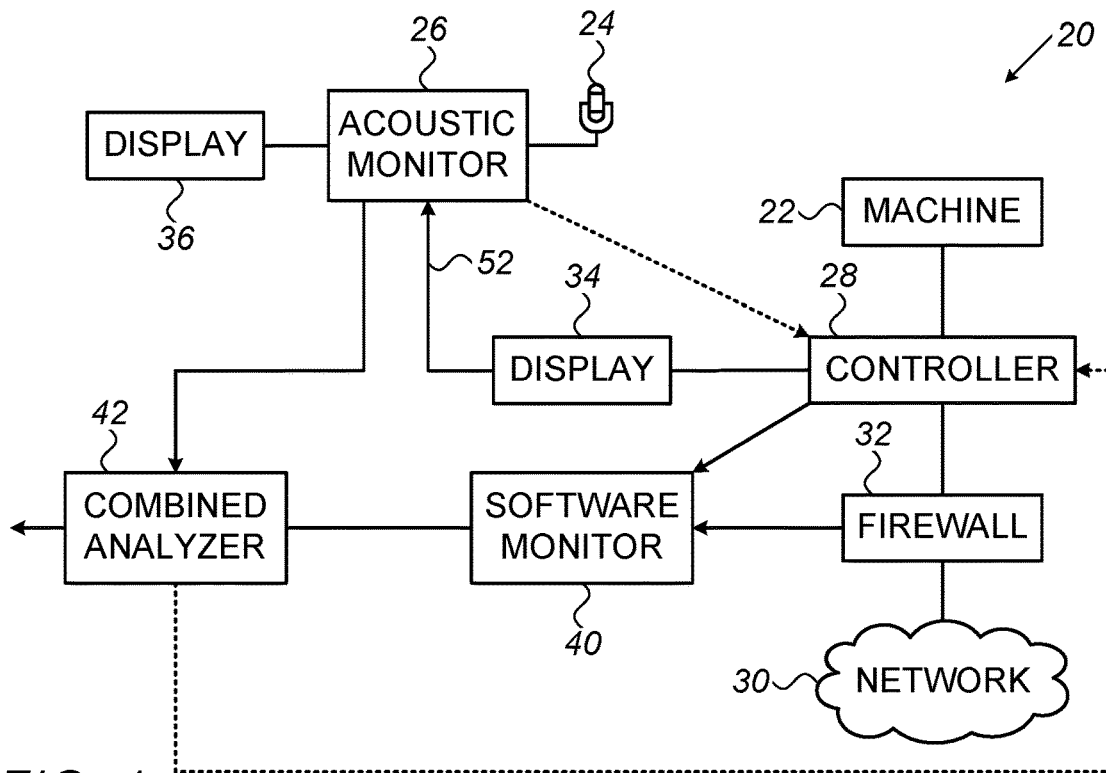
FIG. 1 is a block diagram that schematically illustrates a machine system including acoustic monitoring, in accordance with an embodiment of the invention.

FIG. 1 is a block diagram that schematically illustrates a machine system 20 including acoustic monitoring of a machine 22, in accordance with an embodiment of the invention. In addition to machine 22, machine system 20 includes a microphone 24 and an acoustic signal monitor 26, which analyses acoustic signals collected by microphone 24 from machine 22, in order to monitor the operation of the machine. A controller 28 controls the operation of machine 22. In some embodiments, controller 28 is connected to a communication network 30, such as the Internet, through which operation commands for machine 22 are received from a remote user. A firewall 32 optionally protects controller 28 from unauthorized, possibly malicious, instructions. In some embodiments, a controller display coupled to controller 28, provides feedback on the operation of machine 22. Alternatively or additionally, feedback on the operation of machine 22 is provided to a remote user, through communication network 30. Optionally, a separate display 36, referred herein as monitor display 36, is coupled to acoustic monitor 26 and provides output from monitor 26. Alternatively or additionally, audio and/or tactile output is provided from monitor 26.

Optionally, microphone 24 and acoustic signal monitor 26 are not coupled to machine 22 and/or controller 28. Accordingly, acoustic signal monitor 26 monitors the operation of machine 22 independent of controller 28. Such independent monitoring is particularly useful in cases in which controller 28 malfunctions, for example due to a cyber-attack. Independent feedback on the operation of machine 22, provided by acoustic signal monitor 26, serves as a sanity check for controller 28.

Alternatively to acoustic signal monitor 26 being completely decoupled from machine 22 and controller 28, acoustic signal monitor 26 is coupled to controller 28 in a manner allowing limited transfer of information. In some embodiments, acoustic signal monitor 26 does not receive any information from controller 28. In other embodiments, acoustic signal monitor 26 receives from controller 28 parameter values of the operation of machine 22 and uses these parameter values only to compare them to self determined values of the parameters, as discussed hereinbelow. In these embodiments, the coupling between acoustic signal monitor 26 and controller 28 only allows flow of specific information from controller 28 to acoustic signal monitor 26. Alternatively or additionally, acoustic signal monitor 26 is coupled to controller 28 in a manner allowing submission of emergency instructions, in case a problem requiring immediate intervention is detected. Possibly, a one way link physically limiting passage of signals in only one direction is used in coupling acoustic signal monitor 26 and controller 28.

Machine 22 may be any machine which generates noise during operation, such as pumps, motors, rotating saws and turbines. Machine 22 optionally, repeatedly performs specific tasks, generating a repetitive acoustic signal. Optionally, machine 22 includes one or more rotating elements, such as a shaft, bearing, gear or rotating blade, which generate acoustic signals during rotation. Alternatively or additionally, machine 22 includes a piston which moves back and forth at a specific frequency.

Microphone 24 is designed to collect acoustic signals in a frequency band including the acoustic signals generated by the operation of machine 22. Microphone 24 optionally collects sonic and/or ultrasonic signals. In some embodiments, machine system 20 comprises a plurality of microphones, for noise cancellation.

Acoustic signal monitor 26 may be located adjacent microphone 24 or may be remote from microphone 24 and communicates with the microphone 24 through a wire and/or wireless communication link.

In some embodiments, acoustic signal monitor 26 comprises a programmable processor capable of executing software for carrying out the functions described herein. The software may be downloaded to the processor in electronic form, over a network, for example, or it may, alternatively or additionally, be provided and/or stored on non-transitory tangible media, such as magnetic, optical, or electronic memory. Alternatively or additionally, acoustic signal monitor 26 comprises dedicated hardware and/or firmware which carry out some or all of the tasks of monitor 26.

In some embodiments, acoustic monitor 26 analyzes the acoustic signals and determines whether they are indicative of a possible cyber attack on controller 28. In such cases, acoustic monitor 26 issues a warning, for example, on display 36 and/or sends control instructions to controller 28. In other embodiments, acoustic monitor 26 only analyzes the acoustic signals and transfers the results to a combined analyzer 42, which receives information from other monitors, such as a software monitor 40. Combined analyzer determines whether the information from a plurality of monitors is indicative of a possible cyber attack on controller 28 and accordingly issues a warning and/or takes protective measures.

Figure 2:
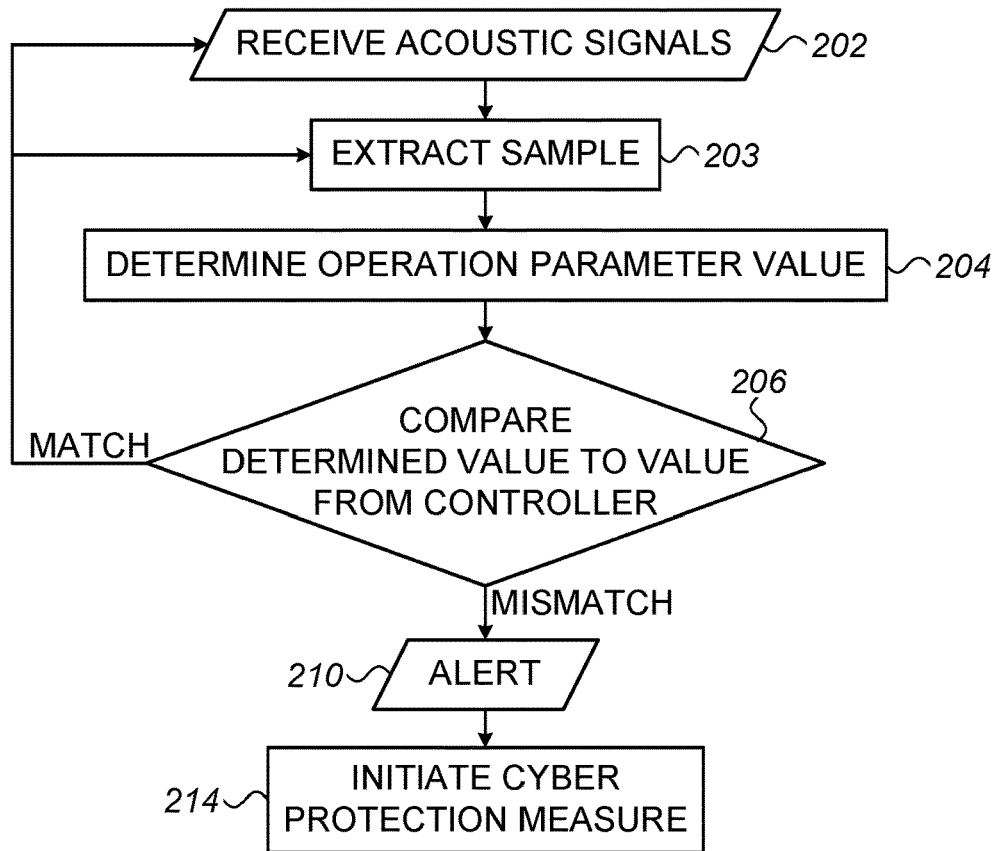
FIG. 2 is a flowchart of acts performed by an acoustic signal monitor, in accordance with an embodiment of the invention.

FIG. 2 is a flowchart of acts performed by acoustic signal monitor 26, in accordance with an embodiment of the invention. Monitor 26 receives (202) acoustic signals collected by microphone 24. A sample for analysis is optionally extracted (203) from the collected signals. Values of one or more parameters of the operation of machine 22 are determined (204) from the extracted sample. The determined parameter values are compared (206) to corresponding parameter values received from controller 28, as indicated by arrow 52 in FIG. 1. If a mismatch is found, an alert is provided (210). Otherwise, signal monitor 26 proceeds to receiving (202) further acoustic signals or extracting (203) further samples from previously received signals.

In some embodiments, the alert is provided (210) to a human operator. Alternatively or additionally, automatic operations are initiated (214) in response to the alert. The automatic operations may include, for example, a shut down of machine 22, a disconnection of controller 28 from network 30, and/or a disconnection of machine 22 from controller 28, possibly along with connection of machine 22 to a standby backup controller. In some embodiments, the automatic operations include sending instructions to controller 28 to change the operation parameters to the required values and/or to predefined emergency values.

Alternatively or additionally, the automatic operations may include further tests to determine whether the mismatch of the parameter values is indicative of a problem. The further tests may include, for example, a virus scan of controller 28 and/or of logs of communications of controller 28.

The automatic operations are optionally selected in response to the extent of the mismatch between the value from controller 28 and the value determined by acoustic signal monitor 26. For example, when a large mismatch is identified, an immediate automatic intervention is optionally performed, while if the discrepancy of the value is small, further tests are performed.

The acts of the method of FIG. 2 may be carried out in response to a user instruction, or according to a predetermined schedule, such as once an hour or once a day. Alternatively, the acts are carried out continuously, or in short intervals, for example every second or every minute.

The extracted (203) sample optionally has a length of between about 0.1-30 seconds, possibly between 1-5 seconds. It is noted, however, that in some embodiments, a shorter sampling period of less than 1 second, less than 0.1 second or even less than 5 milliseconds is used. In other embodiments, a longer sampling period, for example at least 30 seconds, at least 2 minutes or even at least 10 minutes is used.

In some embodiments, acoustic signals are continuously received through microphone 24 and acoustic signal monitor 26 extracts samples of a desired length from the received acoustic signals. Optionally, the samples are extracted beginning at arbitrary time points. Alternatively, for example for machines which operate in different states, acoustic signal monitor 26 determines when the machine is in one or more states of interest and extracts samples from a duration in which the machine was operating in a single specific state of interest. For example, some machines, such as cutting machines, may operate in a neutral state in which the machine operates without interaction with material being processed by the machine and an active state in which the machine comes in contact with the processed material (e.g., the saw is actually cutting material). Optionally, acoustic signal monitor 26 determines when the machine is in the active state and extracts samples during the active state periods.

In some embodiments, the machine operation state is received as an electrical gating signal from the machine. Alternatively, the machine operation state is determined from the received acoustic signals. Optionally, the machine operation state is determined from the acoustic signals by identifying a characteristic background noise of different machine states and accordingly classifying current signals. Alternatively or additionally, the machine operation state is determined by identifying a transition noise, such as a clamping performed before a cutting session begins.

The determined (204) parameter values optionally include a machine operation frequency, such as a rotation frequency or a piston movement frequency. The machine operation frequency is determined using any suitable method known in the art, such as the method described in U.S. Pat. No. 6,778,894 to Beck et al., which is incorporated herein by reference in its entirety, or the method described in U.S. patent application Ser. No. 15/382,765, filed Dec. 19, 2016, which is incorporated herein by reference in its entirety.

In some embodiments, the determined (204) parameter values comprise a fluid flow velocity. The flow velocity may be determined using any suitable method known in the art, such as any of the methods described in Korean patent publication KR101587827, titled, "System For Measuring Flux Of Fluid In Pipe By Using Sound Signal", Chinese patent publication CN105403730, titled "Fluid instantaneous flow velocity measure apparatus and method based on Helmholtz instability", US patent publication 2008/0282781, and US patent publication 2011/0301882, the disclosures of which are incorporated herein by reference in their entirety.

Comparison (206) is optionally considered a mismatch only when the difference in values is greater than a predefined threshold value, e.g., 5% or 10%. In some embodiments, the comparison also takes into account the time during which the mismatch persists. Optionally, the mismatch persists for a long time, an alert is generated even for a small mismatch.

Figure 3:
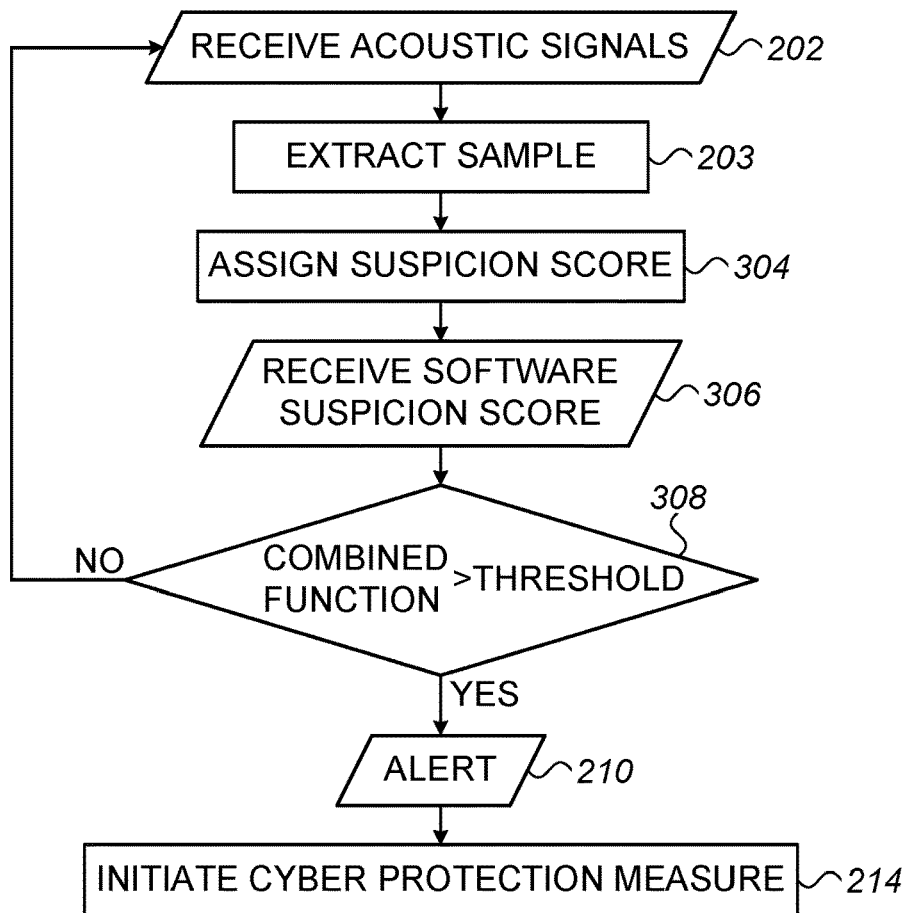
FIG. 3 is a flowchart of acts performed in monitoring a machine, in accordance with another embodiment of the invention.

FIG. 3 is a flowchart of acts performed by acoustic signal monitor 26 and combined analyzer 42, in accordance with another embodiment of the invention. Monitor 26 receives (202) acoustic signals collected by microphone 24. A sample for analysis is optionally extracted (203) from the collected signals, as discussed above regarding FIG. 2. The sample is analyzed to assign (304) an acoustic suspicion score to the sample, which is transferred to combined analyzer 42. Combined analyzer 42 additionally receives (306) a software suspicion score from software monitor 40. If (308) a combined function of the acoustic suspicion score and the software suspicion score is above a threshold value, an alert is provided (210) to a human operator and/or automatic operations are initiated (214) as discussed above regarding FIG. 2.

In some embodiments, the analysis to assign (304) the acoustic suspicion score comprises applying a previously trained machine learning algorithm (e.g., a neural network) to the extracted signals and/or to parameters extracted therefrom. Optionally, during a training phase of the machine learning algorithm, machine 22 is operated in a proper state and one or more improper states. The improper operation states may include, for example, operation at a too high or too low operation frequency and/or with other non-optimal parameters. Alternatively or additionally, during the training phase, machine 22 is operated with standard parameters and samples are collected over a substantial period. Thereafter, times before a machine break down or a required maintenance act are determined and the samples collected at these times are classified as corresponding to the improper operation state.

Samples are collected during the proper and improper states and are loaded into the machine learning algorithm. The acoustic suspicion score is optionally a function of the similarity of the current extracted signals to the signals of the proper state and/or the distance from the signals of the improper operation state. Alternatively, the machine learning algorithm is trained only with samples from a proper state and the acoustic suspicion score is a function of the similarity to the training signals from the proper state.

In some embodiments of the invention, acoustic signal monitor 26 determines from the extracted sample one or more scalar features of the sample and the machine learning algorithm is applied to the scalar features. The scalar features include, for example, the frequency with the highest power or a predetermined number of frequencies with highest power and/or the power of the frequency with the highest power and/or amplitude.

The machine learning algorithm may evaluate a single, current, sample, or may evaluate a plurality of samples. For example, the machine learning algorithm, in some embodiments, evaluates a sequence of a predetermined number of recently collected samples. In other embodiments, the machine learning algorithm evaluates a plurality of samples collected in given intervals, such as once an hour or once a day, to evaluate abnormal changes over time.

The software suspicion score is optionally determined by software monitor 40 by applying anomaly detection using a machine learning algorithm, to data of controller 28, such as information on resource utilization of the controller. In some embodiments, data of controller 28 relates to hardware utilization, communication logs and/or software utilization. The anomaly detection is performed using any suitable method known in the art, such as any of the methods described in U.S. Pat. No. 7,752,665 to Robertson et al., US patent publication 2008/0271143 to Stephens et al., US patent publication 2016/0277423 to Apostolescu et al., US patent publication 2016/0275289 to Sethumadhavan et al., US patent publication 2016/0234235 to Jover et al., US patent publication 2008/0276111 to Jacoby et al., and/or PCT publication 2016/115280, titled "Anomaly and Malware Detection using Side Channel Analysis", the disclosures of which are incorporated herein by reference in their entirety.

Alternatively to calculating the software suspicion score and/or the acoustic suspicion score using a machine learning algorithm, one or more of the suspicion scores is calculated by comparing extracted raw data to predefined base data. For example, a correct noise profile may be generated for the machine based on a test operation and the suspicion score is assigned based on a similarity of the current extracted sample to the correct noise profile. The comparison may be performed using any suitable method known in the art, for example any of the methods described in US patent publications 2016/0117905 or 2002/0020561 and/or U.S. Pat. No. 8,903,558 or 6,507,790 which are incorporated herein by reference in their entirety.

In other embodiments, correct base parameter values are defined for the machine and the suspicion score is calculated as a function of the similarity of parameter values calculated from the current sample to the correct parameter values.

The combined function of the acoustic suspicion score and the software suspicion score is optionally a weighted sum of the scores. In some embodiments, predetermined weights are assigned to the acoustic suspicion score and the software suspicion score, for example, equal weight. In other embodiments, the weights vary depending on the quality of the acoustic signals. When the acoustic signals are classified high quality they are given larger weight, while when the acoustic signals are classified as low quality they are given less weight.

It is noted that each of acoustic signal monitor 26, software monitor 40 and combined analyzer 42 may be implemented on a separate processor and/or dedicated hardware circuit, or two or even all three units may be implemented by a single processor or dedicated circuit. In some embodiments, instead of calculating a separate acoustic suspicion score and a separate software suspicion score, combined analyzer 42 receives the raw acoustic signals and controller data and applies a machine learning algorithm to the received raw data.

Figure 4:
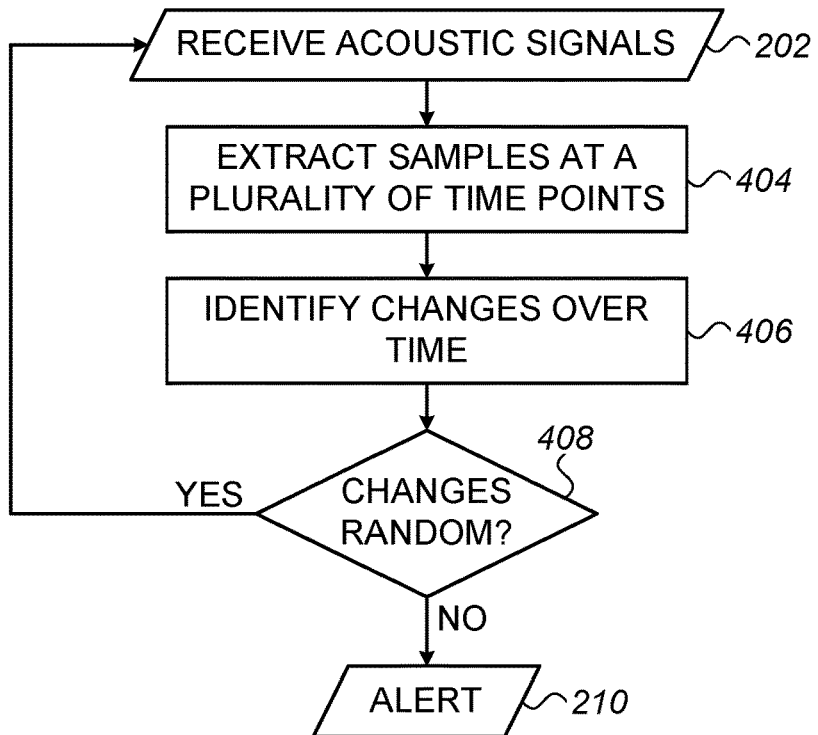
FIG. 4 is a flowchart of a performed by an acoustic signal monitor, in accordance with still another embodiment of the invention.

FIG. 4 is a schematic flowchart of acts performed by acoustic signal monitor 26, in accordance with another embodiment of the invention. Acoustic signals are received (202) and samples are extracted (404) at a plurality of time points. The extraction of the samples is performed using any of the methods discussed above regarding FIG. 2. Changes over time in the samples are identified (406), and acoustic signal monitor 26 analyzes the changes using one or more tests to determine whether (408) the changes are suspicious of being non-random. If (408) the changes are suspected as being non-random, an alert is issued. Any of the alerts mentioned above, as well as the responses to the alerts, may be applied in the present embodiment.

In some embodiments of the invention, the samples are collected at relatively dispersed intervals, for example, at intervals of at least an hour, 4 hours, or a day. Alternatively, the samples are collected relatively frequently, for example at intervals shorter than 1 minute or even shorter than 1 second.

The analysis of the changes is performed in some embodiments by direct comparison of the acoustic signals and/or of their frequency spectrum, using any suitable method known in the art, such as the methods referenced above. In other embodiments, the comparison of the signals is performed based on one or more features of the samples, such as any of the features discussed above. In still other embodiments, the comparison is performed on parameters of machine 22, such as the parameters discussed above with reference to FIG. 2 or any of the following discussed parameters.

A parameter used in the comparison, in some embodiments, includes an acoustic signal distinction parameter calculated as a measure of a portion of the power of the sample that is within a limited band around the received operation frequency, and optionally one or more of its additional harmonics. In one embodiment, the signal distinction parameter (SDP) is calculated using the formula:

$$SDP = \frac{\sum_{n=1}^{k} \sum_{m=-j}^{j} f^2(n\omega + m*d\omega)}{\sum_{n=1}^{k} \sum_{m=-l}^{l} f^2(n\omega + m*d\omega) - \sum_{n=1}^{k} \sum_{m=-j}^{j} f^2(n\omega + m*d\omega)}$$

in which f( ) is the absolute value of the FFT of the acoustic signal, ω is a received operation frequency of the machine, k is the number of harmonic windows being used in the calculations and dω is the frequency resolution of the FFT. The defined frequency neighborhood width is represented by j, and l defines the entire width of the harmonic windows.

In some embodiments of the invention, the comparison is based on a regularity parameter and/or an operation ratio parameter. The regularity parameter is optionally calculated as a function of an entropy or other measure of regularity within a frequency window of a frequency spectrum of the noise sample. A high regularity value is indicative that the machine does not have a distinctive noise within the frequency window. The operation ratio parameter is optionally calculated as a ratio between a value of a parameter of the noise in different states, e.g., an active state in which the machine is interacting with raw material and neutral state in which the machine is not interacting with raw material.

The acoustic signal distinction parameter, regularity parameter and/or operation ratio parameter are optionally calculated using any of the methods described above referenced U.S. patent application Ser. No. 15/382,765, although any other suitable method may be used.

It is noted that the above parameters were brought as examples and that the analysis of changes may be performed on any other relevant parameters.

Referring in detail to determining whether (408) the changes are suspicious, in some embodiments, the acoustic signals, features and/or parameters are examined to identify repetitive changes following a pattern. Optionally, the determination checks for changes occurring repeatedly at specific times of the day, at specific intervals and/or at round times. Particularly, special attention is optionally given to changes at times between shift changes, worker breaks and/or at times at which background noise is expected to be high. A cyber attacker may set the machine to operate at night and/or weekends, when people are not around, at inefficient and/or damaging frequencies.

In some embodiments, the analysis checks for changes back and forth between two or more distinctive waveforms or feature/parameter values. Particularly, some parameters are expected in normal operation to slowly drift in a specific direction. Drifting in one direction and then in the opposite direction is optionally identified as suspicious.

In some embodiments of the invention, parameter changes occurring more frequently than a threshold value are considered suspicious. For example, in some cases, a cyber-attack may involve an attempt to ruin machine 22 by constantly changing its operation parameters. Early detection of such machine behavior from the acoustic signals may allow counteracting the attack by shutting down the machine, disconnecting controller 28 and/or disabling a malware on controller 28.

Further, in many cases, normal changes of parameters due to natural machine wear and tear are expected to be gradual. Abrupt changes are optionally considered suspicious.

Optionally, for each of one or more parameters and/or features, acoustic signal monitor 26 is configured with a corresponding threshold indicative of what is considered an abrupt change. Alternatively or additionally, the change may be evaluated as a percentage of its current value, and changes of a percent above a specific percentage are considered suspicious. In some embodiments, a suspicion score is assigned to each change and an alert is issued when a suspicion score above a given value is reached within a predetermined time frame.

Optionally, abrupt changes are only considered suspicious of being caused by malware when they are not due to known factors and/or followed by a malfunctioning of machine 22. For example, when an abrupt change is followed by a smooth operation it may be indicative of intentional malware.

In some embodiments, an increased rate of change of the signal distinction parameter and/or of the regularity parameter may be indicative of increased wear in machine 22 caused by a cyber-attack.

It will thus be appreciated that the embodiments described above are cited by way of example, and that the following claims are not limited to what has been particularly shown and described hereinabove. Rather, the scope includes both combinations and sub-combinations of the various features described hereinabove in different embodiments, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of cyber protection of a machine, comprising:
   acquiring acoustic signals from a vicinity of a machine, at a plurality of time points;
   comparing, by a processor, the acoustic signals or parameters of the acoustic signals for different time points, to identify changes in the acoustic signals over time responsively to the acquired acoustic signals at the plurality of time points;
   analyzing the identified changes to check whether the changes have one or more characteristics indicative of intentional changes; and
   initiating, by the processor, a cyber alert, responsive to identifying in the checking, a characteristic indicative of intentional changes,
   wherein analyzing the identified changes to check whether the changes have one or more characteristics indicative of intentional changes comprises identifying a plurality of changes occurring at time points having a regularity indicative of being non-random.

2. The method of claim 1, wherein analyzing the identified changes to check whether the changes have one or more characteristics indicative of intentional changes comprises identifying abrupt changes followed by smooth operation.

3. The method of claim 1, wherein analyzing the identified changes to check whether the changes have one or more characteristics indicative of intentional changes comprises identifying a first acoustic profile of the machine at a first time point, a second acoustic profile of the machine at a second time point, after the first time point, and a return to the first acoustic profile at a third time point after the second time point.

4. The method of claim 1, wherein identifying the plurality of changes occurring at time points having a regularity indicative of being non-random comprises identifying a plurality of changes occurring at time points distanced from each other by equal intervals.

5. The method of claim 1, wherein identifying the plurality of changes occurring at time points having a regularity indicative of being non-random comprises identifying a plurality of changes occurring at time points distanced from each other by round time intervals.

6. The method of claim 1, wherein identifying the plurality of changes occurring at time points having a regularity indicative of being non-random comprises identifying a plurality of changes occurring at time points at round clock times.

7. The method of claim 1, wherein comparing the acoustic signals or parameters of the acoustic signals for different time points comprises comparing the acoustic signals themselves.

8. The method of claim 1, wherein comparing the acoustic signals or parameters of the acoustic signals for different time points comprises comparing frequency spectrums of the acoustic signals.

9. The method of claim 1, wherein comparing the acoustic signals or parameters of the acoustic signals for different time points comprises comparing features extracted from the acoustic signals.

* * * * *